United States Patent
Kurien et al.

(10) Patent No.: US 11,176,321 B2
(45) Date of Patent: Nov. 16, 2021

(54) AUTOMATED FEEDBACK IN ONLINE LANGUAGE EXERCISES

(71) Applicant: International Business Machines Corporation, Armonk, NY (US)

(72) Inventors: Toby Kurien, Midrand (ZA); Richard Allen Young, Johannesburg (ZA); Maletsabisa Molapo, Pretoria (ZA); Ismail Yunus Akhalwaya, Emmarentia (ZA)

(73) Assignee: International Business Machines Corporation, Armonk, NY (US)

( * ) Notice: Subject to any disclaimer, the term of this patent is extended or adjusted under 35 U.S.C. 154(b) by 232 days.

(21) Appl. No.: 16/401,254

(22) Filed: May 2, 2019

(65) Prior Publication Data

US 2020/0349224 A1  Nov. 5, 2020

(51) Int. Cl.
| | |
|---|---|
| *G06F 40/232* | (2020.01) |
| *G09B 19/06* | (2006.01) |
| *G06N 3/08* | (2006.01) |
| *G06N 3/04* | (2006.01) |
| *G06F 40/274* | (2020.01) |

(52) U.S. Cl.
CPC .......... *G06F 40/232* (2020.01); *G06F 40/274* (2020.01); *G06N 3/0454* (2013.01); *G06N 3/08* (2013.01); *G09B 19/06* (2013.01)

(58) Field of Classification Search
CPC .............................. G06F 40/274; G06N 3/0454
See application file for complete search history.

(56) References Cited

U.S. PATENT DOCUMENTS

| | | | |
|---|---|---|---|
| 7,664,629 B2 | 2/2010 | Dymetman et al. | |
| 2012/0271631 A1* | 10/2012 | Weng | G10L 15/18 704/243 |
| 2015/0332673 A1* | 11/2015 | Li | G06F 40/30 704/235 |
| 2015/0348541 A1* | 12/2015 | Epstein | G10L 15/063 704/257 |
| 2020/0152180 A1* | 5/2020 | Lee | G06N 3/0454 |

FOREIGN PATENT DOCUMENTS

| | | |
|---|---|---|
| CN | 108519974 A | 9/2018 |
| CN | 108681533 A | 10/2018 |
| WO | 2019/024050 A1 | 2/2019 |

OTHER PUBLICATIONS

NIST, "NIST Cloud Computing Program", http://csrc.nist.gov/groups/SNS/cloud-computing/index.html, Created Dec. 1, 2016, Updated Oct. 6, 2017, 9 pages.

* cited by examiner

*Primary Examiner* — Thomas H Maung
(74) *Attorney, Agent, or Firm* — Scully, Scott, Murphy & Presser, P.C.; Shimon Benjamin

(57) ABSTRACT

Language models may be run with an input set of words in a given sentence. Each of the language models can predict a set of next candidate words to follow the input set or words. Based on the sets of next candidate words predicted by the language models and an actual next word, language guidance can be provided.

18 Claims, 9 Drawing Sheets

AUTOMATED FEEDBACK IN ONLINE LANGUAGE EXERCISES

BACKGROUND

The present application relates generally to computers and computer applications, and more particularly to artificial intelligence, machine learning and providing automated feedback in language usage.

There are various tools such as proofing tools and word processing tools, which may provide or suggest spelling and/or grammatical error corrections in spoken or written language, such as in English language. For instance, such tools may be enabled to recognize and tag words or sentences perceived or determined by the tools to be incorrectly used.

BRIEF SUMMARY

Systems and methods may be provided, which may provide feedback automatically in language usage, for example, in online language exercises. A system, in one aspect, can include at least one hardware processor. A memory device can be coupled to the at least one hardware processor. A first language model can be stored on the memory device and a second language model can be stored on the memory device. At least one hardware processor may be operable to run the first language model with an input set of words in a given sentence. The first language model can output a first set of candidate words predicted to follow the input set of words in the given sentence. The first language model can further output a score associated with each of the candidate words in the first set of candidate words. At least one hardware processor may be further operable to run the second language model with the input set of words in the given sentence. The second language model can output a second set of candidate words predicted to follow the input set of words in the given sentence. The second language model can further output a score associated with each of the candidate words in the second set of candidate words. At least one hardware processor may be further operable to receive an actual word following the input set of words. Responsive to determining that the actual word matches with a candidate word in the first set of candidate words, at least one hardware processor may be further operable to update a first cumulative tally associated with the first language model with the score associated with the candidate word in the first set matching the actual word. Responsive to determining that the actual word matches with a candidate word in the second set of candidate words, at least one hardware processor may be further operable to update a second cumulative tally associated with the second language model with the score associated with the candidate word in the second set matching the actual word. Responsive to determining that the first cumulative tally and the second cumulative tally deviate by more than a pre-defined threshold, at least one hardware processor may be further operable to identify the actual word in the given sentence for flagging.

A method, in one aspect, may include running a first language model with an input set of words in a given sentence, the first language model outputting a first set of candidate words predicted to follow the input set of words in the given sentence. The method may also include running a second language model with the input set of words in the given sentence, the second language model outputting a second set of candidate words predicted to follow the input set of words in the given sentence. The method may further include, based on the first set of candidate words, the second set of candidate words, and an actual next word following the input set of words, providing guidance for phrasing the given sentence.

A method, in another aspect, may include inputting an input set of words in a given sentence to a first language model. The first language model can output a first set of candidate words predicted to follow the input set of words in the given sentence. The first language model can further output a score associated with each of the candidate words in the first set of candidate words. The method may also include inputting the input set of words in the given sentence to a second language model. The second language model can output a second set of candidate words predicted to follow the input set of words in the given sentence. The second language model can further output a score associated with each of the candidate words in the second set of candidate words. The method may also include receiving an actual word following the input set of words. The method may further include, responsive to determining that the actual word matches with a candidate word in the first set of candidate words, updating a first cumulative tally associated with the first language model with the score associated with the candidate word in the first set matching the actual word. The method may also include, responsive to determining that the actual word matches with a candidate word in the second set of candidate words, updating a second cumulative tally associated with the second language model with the score associated with the candidate word in the second set matching the actual word. The method may further include, responsive to determining that the first cumulative tally and the second cumulative tally deviate by more than a pre-defined threshold, causing the actual word in the given sentence to be flagged.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
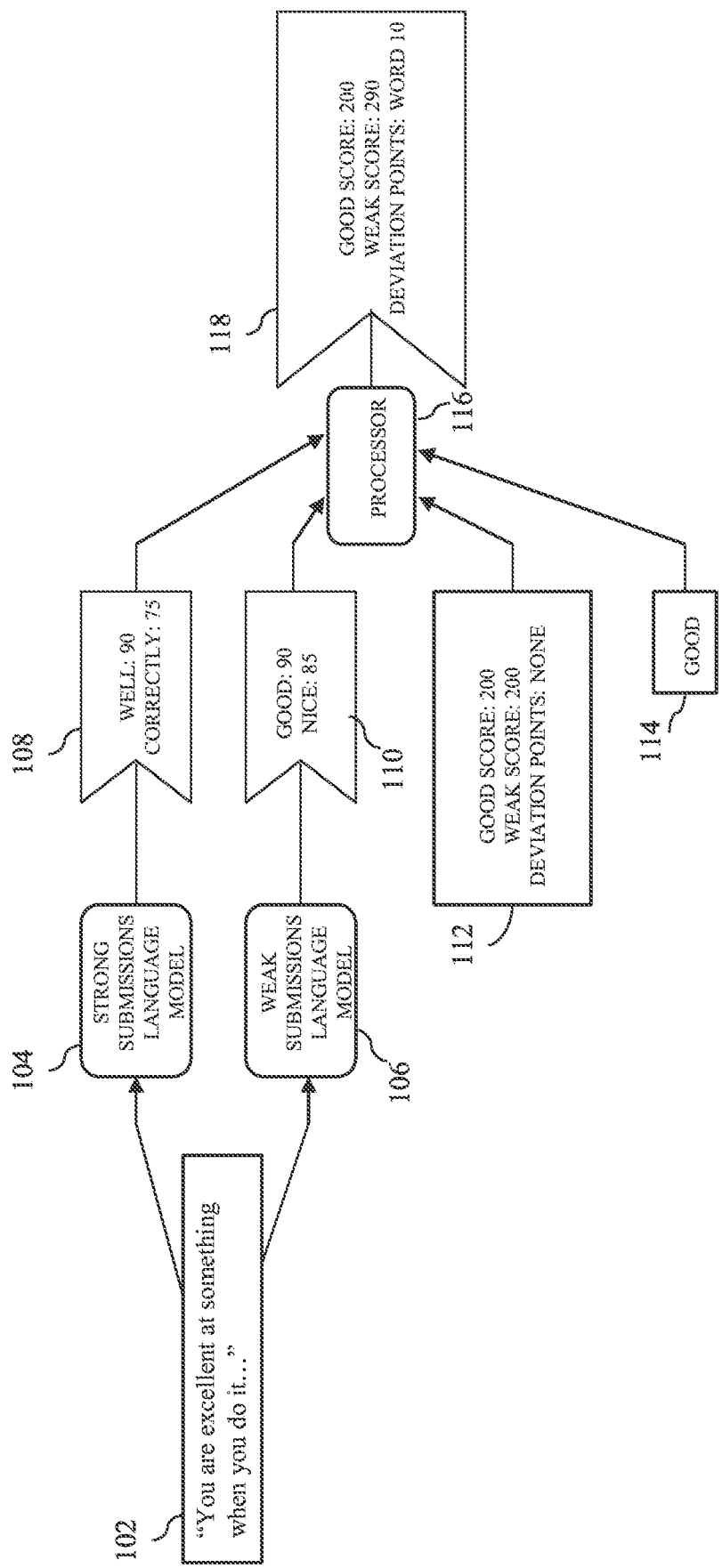
FIG. 1 is a diagram illustrating a sentence fed into two models and processing of outputs of the models in one embodiment.

A system and method are disclosed for generating and/or providing automated corrective feedback to users or students during written language exercises taken on a computer. In one embodiment, the system may include separately trained language models, for example, one trained on "good" or "strong" language works (e.g., written submissions determined to have proper language usage), the other on "weak" language works (e.g., written submissions determined to have weak or less proper language usage) of the same cohort. In one embodiment, the system feeds in written work, a word at a time to the language models. In one embodiment, the system determines the deviation of the written work towards the weak language model. In one embodiment, the system suggests or offers possible ways for the writer to improve the work. A related method is also disclosed.

The system may improve an automated system and/or tool which provides automatic corrections, for example, in language usage such as written language. The system and/or method may provide guidance in an automated manner to a user or student, for example, during language exercises, for example, performed or taken on a computer.

In one embodiment, the system may provide automatic, artificial intelligence (AI)-driven guidance to a user during a written language exercise. The system in one embodiment may extend automatic corrections to include higher-level constructs, and for example, can recognize incorrect usage of a language, for example, incorrect word order and other aspects of sentence structure, usage of articles, verb tenses, and/or others. The system in one embodiment can be easier to deploy and have the property of being able to use the written exercises from the system to train and further improve itself over time.

The system, in one embodiment, which may be AI-based, can detect a mistake in a language usage and provide a suggestion on how to correct the mistake. The system can be made aware of colloquialism, for example, and can offer guidance for avoiding it, if desired, which may be difficult for a rules-based system to implement. The system can model and then identify local or contextual mistakes that differ from region to region. This guidance can suggest changes moving text submissions from one state to another, for example, from perceived "poor" to "good" quality or from one style to another.

The system in one embodiment models the effects of linguist background, and local and/or contextual language usage, for example, to identify mistakes, which a generic tool may not be able to identify. For example, the system in one embodiment can identify the following sentence as an incorrectly structured sentence: "Also me, I can be able to write an essay."

A language model (also known as (a.k.a.) a sequence model) is an artificial intelligence construct (e.g., a Recurrent Neural Network), which given a word or sequence of words, predicts the next most likely word based on its training data. As an example, a language model trained on a known author's works, when fed with the word "just", might suggest that the next word is most likely "after", and feeding those two words in (and so on for additional outputs) might produce output that looks as follows (this output is taken from an actual trained sequence model): "just after that thereby how made with the way anything, and set for harmless philos".

The above demonstrates that the language model has assimilated some style, phrasing, and vocabulary from the training data. An embodiment of a system and/or method in accordance with the present disclosure, use multiple trained language models to detect mistakes and to provide guidance. One or more language models are trained on "good" or "strong" submissions from students, others on "weak" submissions. The strong submissions language models may also be trained on available content such as Wikipedia content, academic papers or formal writings, newspaper or blog content, and/or others. The weak submissions language models may be trained on submissions of users or students from various grades and from various schools, including schools from different locations or countries. Strong and weak submissions may be obtained from other or different sources.

Common local mistakes associated with a region, in writing the English language, for example, can be observed on social networks, such as social network blogs or messages or other content posted on a social network website pages. In one embodiment, such local data can be extracted, for example, based on specific hashtags that can be attributed to certain groups of users. Social network blog data can help the language model to learn local mistakes in language usage, e.g., incorrect English usage, and also to evolve informal writing that is used on social networks. Such a language model can influence how learners write, for example, in a classroom or formal setting. For instance, regional local information can be utilized for correcting non-native language usage by learners in that region learning to use (e.g., write) that non-native language. As an example, local regional information associated with a learner of the English language as a second language can be used by the models.

In an example use case, a user can be entering written work on a computer, for example, via a user interface. The system in one embodiment can receive the user entry, for example, including words forming a sentence. A plurality of such sentences can be received. The system can extract a sentence, and incrementally feed the sentence through the "weak" and "strong" ("good") submissions language models, adding one additional word to the input at a time. At each step the output that the model provides is a set of predicted possible next words along with a score of how well the predicted word fits into the language style of that model. The system keeps track of a tally of the sentence scores for each model.

Once the entire sentence has been fed through all of the models, the system can have a score of how well the sentence matches to each model, for instance, by comparing word by word a sentence output by a model with the actual user written sentence. The system can keep track of where the sentence deviated significantly from the sentence output by one or more "good" or "strong" submissions language models (e.g., trained based on submissions such as written works determined to be strong or determined to have proper usage of the language), which allows it to pinpoint an area or areas of the sentence that need to be highlighted for the user or student to review.

FIG. 1 is a diagram illustrating feeding of a sentence into two models and processing of outputs of the models in one embodiment. Consider the following sentence which deviates from well written English in the final word: "You are excellent at something when you do it good." The sentence 102 is input to a first model 104 and a second model 106. The first model 104, for example, is a model trained on well written works or works determined to be written with proper usage of a given language. Given an input sentence or phrase, the model trained on such data set can detect proper usage of a language in the input sentence or phrase. An example of a given language is the English language. The second model 106 is trained on works or submissions that include weak use of the given language, for example, those determined to use improper or awkward use of the given language. Given an input sentence or phrase, the model trained on such data set can detect weak or less proper usage of the language in the given input sentence or phrase. The sentence up until the current word is input to each of the language models. The words in the sentence can be input to the first model 104 one at a time. The words in the sentence can be input to the second model 106 one at a time. Each of the two models 104, 106 can independently predict a next word in the sentence, or a set of next words with confidence scores. For example, the first model 104 predicts, based on its learned parameters (e.g., weights and bias), the next word in the sentence. The first model 104 can also output a confidence or likelihood score associated with the predicted next word. For instance, as shown at 108, the first model 104 may predict that the next word is "well" with confidence score of 90, and also predict that the next word is "correctly" with confidence score of 75. For example, the chance or probability of the next word being "well" is 90; the chance or probability of the next word being "correctly" is 75. Similarly, the second model 106 predicts, based on its learned parameters (e.g., weights and bias), the next word in the sentence. The second model 106 can also output a confidence or likelihood score associated with the predicted next word. For example, the output of each of the language models 104, 106 is a set of predicted next words along with their score (likelihood). For instance, as shown at 110, the second model 108 may predict that the next word is "good" with likelihood score (or probability) of 90, and also predict that the next word is "nice" with likelihood score (or probability) of 85.

In this example, up until the final word of the sentence, there may be similar scores predicted from the first language model 104 (e.g., strong submissions language model) and the second language model 106 (e.g., weak submissions language model), for example, as shown at 112. The word predictions along with the actual next word and the current tally of strong and weak scores are passed into a processor. Consider that the actual next word entered is "good". The word predictions with their associated scores 108, 110, current accumulation or tally 112 of scores from the first model 104 and the second model 106, and the actual word 114, are input to a processor 116. The processor 116, for example, can be a computer executable component or module.

The processor 116 determines whether the actual next word (e.g., "good") appears in any of the first or second models' prediction sets, e.g., "well" and "correctly" from the first model's output, and "good" and "nice" from the second model's output. If the actual word appears in the prediction set, the processor adds the word score to the score tally associated with the model that predicted the actual word. In this example the word "good" does not appear in the first model's prediction set, so nothing is added to the tally associated with the first model. However, the word "good" does appear in the second model's prediction set, therefore, the word score is added to the second model's tally. For example, as shown at 118, the tally associated with the first model (e.g., strong submissions language model) remains the same as the previous tally (shown at 112); the tally associated with the second model (e.g., weak language model) is incremented by the score associated with the word "good" (e.g., predicted by the weak submissions language model with confidence score of "90", as shown at 110). The processor 116 can keep track of the position of words where the scores from the first model and second model (e.g., strong and weak submissions language models) deviate. For example, deviation points can include or specify a word position 10 (representing the position of the word 'good' in this example), which is the position the two models deviated in their predictions.

Figure 2:
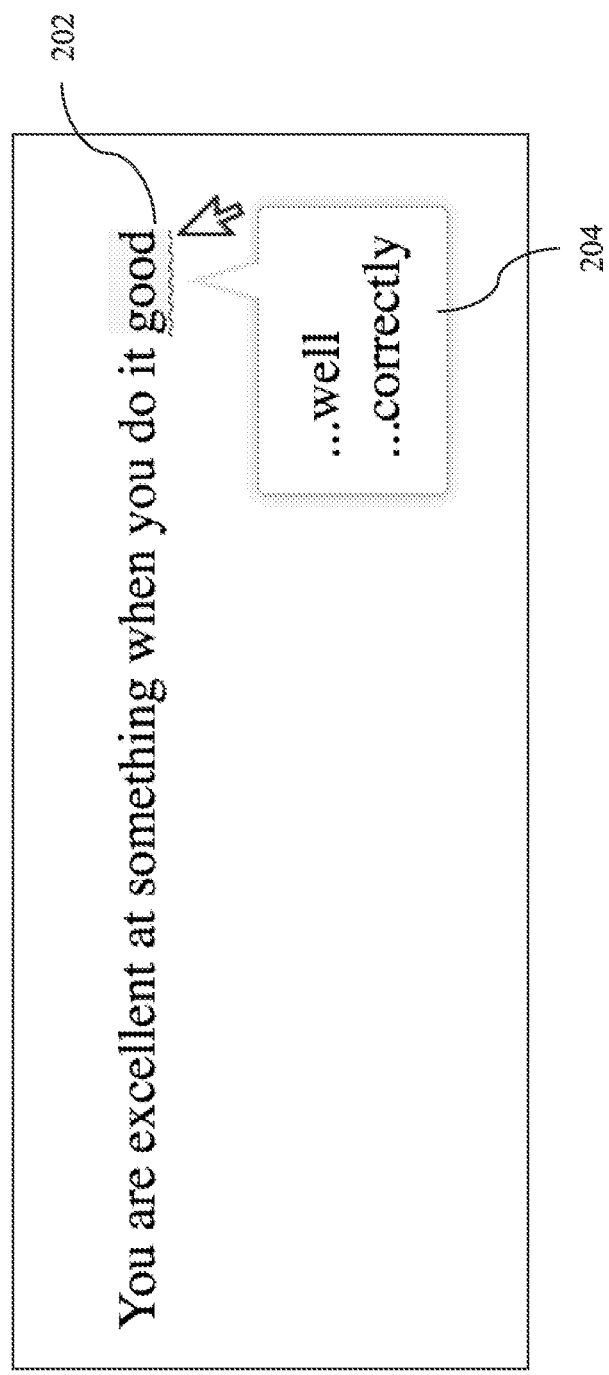
FIG. 2 shows an example of a user interface display showing a sentence in one embodiment.

Notification or alert with respect to words that deviate in the predictions of the models 102, 104 can be communicated. For example, words that deviate can be highlighted via a user interface. In one embodiment, a system and/or method may cause, direct or control a user interface or the like to highlight one or more words at which the strong and weak submissions language models probabilities deviate by more than a pre-selected or pre-defined threshold. The pre-defined threshold can be configurable. FIG. 2 shows an example of a user interface display showing a sentence in one embodiment. For instance, a user or student may be entering or inputting (e.g., by typing in the sentence) on a computer via a user interface such as a graphical user interface (GUI) on a computer screen or another input mechanism, and the input sentence can be presented or displayed on the computer screen. A word having a probability deviation greater than the pre-defined threshold can be highlighted via the user interface, for example, shown at 202. Highlighting may be provided in any form of annotation, for example, underline, shade, and/or others. The words on the user interface can be rendered as a selectable object on the user interface. In response to the user or student clicking on the highlighted word, the user interface may show or present a set of predictions 204 from the first model (e.g., strong submissions language model) as a possible way to begin improving the sentence. The set of predictions 204 can be presented as a pop-up object, a call-out object, or another object on the user interface. This can be viewed as being different from a correction, as no sentence structure or phrase correction is suggested, but provides a guidance that the student can follow to discover how to improve the writing.

In another embodiment, language models can be trained in various categories of works such as written works, such as but not limited to:

Shakespearean writing: trained on the works of William Shakespeare

Academic: trained on academic publications

Formal: trained on newspaper articles, Wikipedia, or other publications

Emotional: trained on emotive works of fiction

Blog: trained on numerous blog articles

Poetry: trained on works of poetry

A user or student, for example, can choose a category of model to focus the student's efforts on. As another example, a teacher or instructor or the like can set a category for the students. Such a category setting can diversify the user or student's writing ability. In each category, a system can train both strong and weak submissions language models. For example, a strong submissions language model can be trained on the actual original corpus or submissions of written work determined to have proper language usage, which may be received, retrieved, or obtained from an external source such as other schools, or departments related to education for that category. A weak submissions language model can be trained on previous submissions of students in that category that were considered to include weak language usage.

In yet another embodiment, the submissions can be grouped into cohorts, so that there are different models trained per cohort, for each category. As an example, there may be models for "Poetry for Grade 8" (one cohort), and models for "Poetry for Grade 10" (a different cohort). Cohorts can also be based on different factors or group categories. Another example of a cohort can be based on proficiency level, for example "Poetry for [X] native speakers taking English as a second language", wherein X can be a language spoken in a given region or location. The cohort selection can be made automatically by the system by taking into consideration the context of the user (such as age, first language, location, etc.). The system also may select a cohort automatically by comparing the written work of the user to the various models and cohorts to select the most similar one. This way, as the user improves in proficiency, a different cohort can automatically be selected. In the case of teacher grading, the system may cause, direct or control a user interface to display a student's automatically selected cohort, thus showing the teacher the proficiency level of the student. The system can also display the deviations from the strong submissions language model in order to assist the teacher in grading.

In still yet another embodiment, a system may also compute a score associated with language incorrectness of a written submission. In one embodiment, such a score may not be displayed to the learner unless the teacher decides to. The system can generate a report associated with such a score per student and for the class. For example, the system can show to the teacher the range of mistakes that are common among the learners, and the progress of each learner over time. A score associated with language incorrectness can be a percentage value that indicates the number of words in the student's submission that have been flagged with a high probability of being incorrect or weak language (e.g., English) phrasing, with reference to the total number of words in the submission. In one embodiment, a model is a per-word model that checks the probability of every word's closeness to strong or weak English usage, and the number of corrected words indicates the extent to which the submission deviates from the choice of words in proper English.

The system can collect, per student and for the class, the words that are commonly corrected, and these words can be classified by semantic similarity to understand the types of words that students often get wrong. In addition, from these data (type of words), a weak language model can further learn word sequences that have the higher likelihood of being associated with incorrect language usage.

A system and method in some embodiments can provide automated guidance to students during language exercises (e.g., written language exercise) entered electronically, for example, on a computer. The guidance can highlight sentences (or words) in the written work (for example, by underlining with a wavy line or by another highlighting method) if the sentence correlates highly with weak submissions. Whether the sentence correlates "highly" can be determined based on comparing with a predefined threshold.

In some embodiments, the guidance can be based on using two or more language models that have been trained on historical submissions. The submissions can be obtained from various grades and various schools. One group of language models can be trained on weak submissions, while the other group can be trained on strong submissions and/or strong examples of written work such as publications. The system analyses the written work one sentence at a time, by feeding in one word at a time into each set of language models. The system can compare the outputs of the two groups of language models against each other. If the sentence correlates more closely to the language models trained on weak submissions than that of the strong submissions, then the system can flag or cause to flag the sentence or a deviating word, for example, by highlighting or causing to highlight the sentence or the deviating word on a user interface, for example, as needing review.

The correlation of the input sentence to the output of the language models is calculated by feeding the sentence progressively into each language model, and checking the probability of the next word predicted by each language model, that the student wrote. For each model (e.g., strong submissions and weak submissions language models), the predicted probability per word can be stored, and added up for the sentence. The model with the higher total tally can be determined as the one the sentence most correlates with. One or more words in the sentence can be highlighted or caused to be highlighted, where the strong submissions language model and the weak submissions language model's probabilities deviate by more than a pre-selected threshold, for example, for review. Responsive to the user clicking on or selecting the highlighted portion, one or more alternate words can be presented or displayed. These suggestions are the outputs of the language model(s) trained on strong submissions, giving the student the opportunity to incorporate into or rephrase their sentence.

In some embodiments, a "proficiency score" is calculated as a percentage value that indicates the number of words in the student's submission that have been flagged with a high probability of incorrect usage or phrasing of the language (e.g., English), for example, the number of words highlighted in comparison to the total number of words in the submission.

Figure 3:
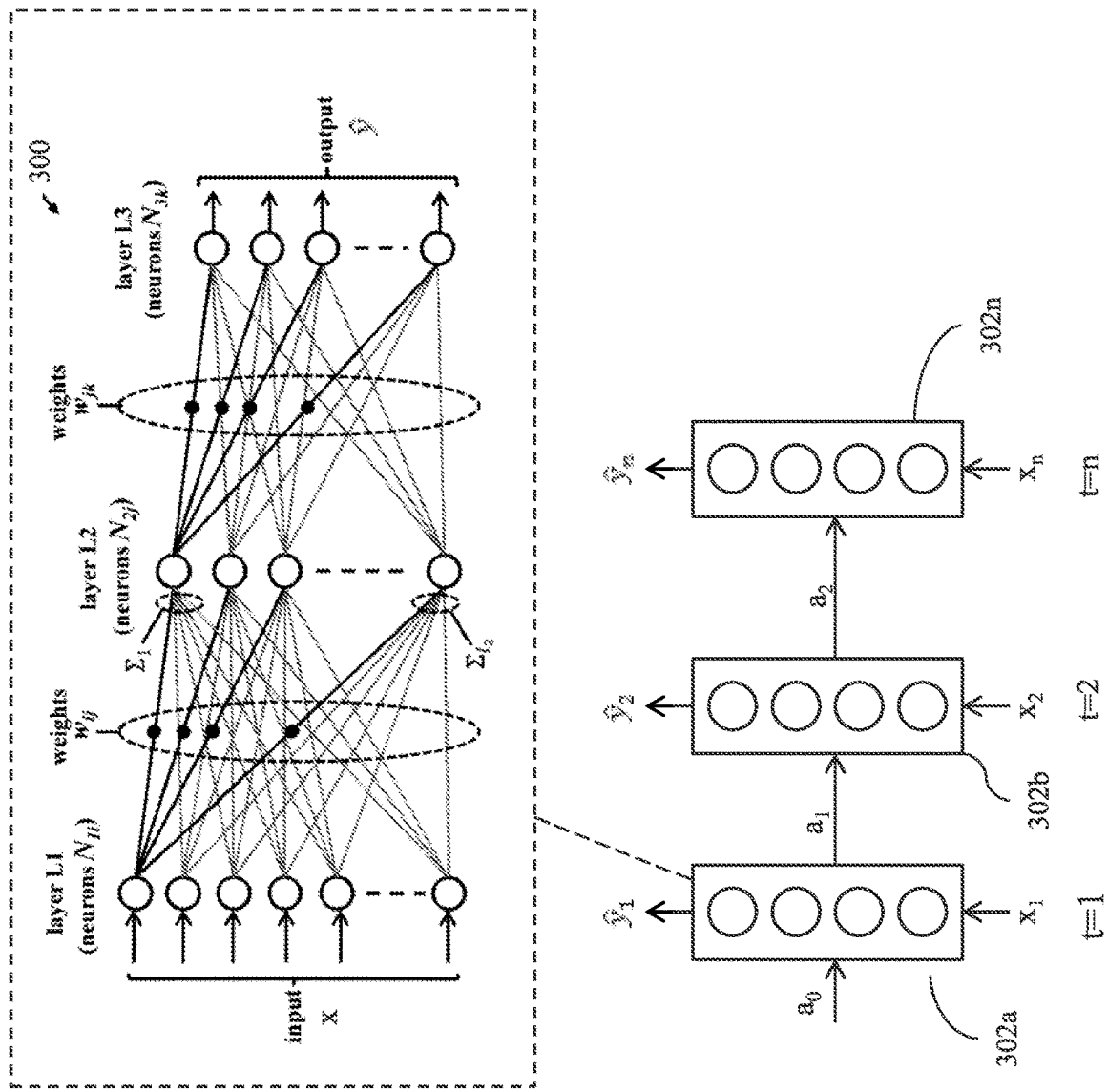
FIG. 3 is an example neural network model in one embodiment, which can be trained based on a training data set.

FIG. 3 is an example model, which can be trained based on training data set. As described herein, the training data set can include data determined to have strong or proper language usage to train a "good" or "strong" submissions language model. Another training data set can include data determined to have weak language usage to train a "weak" submissions language model. Further the training data set can be grouped by different cohorts for different purposes as described above.

In one embodiment, a model can be an artificial neural network model, also referred to as a neural network model, for example, shown at 300. An embodiment of an implementation of an artificial neural network can include a succession of layers of neurons, which are interconnected so that output signals of neurons in one layer are weighted and transmitted to neurons in the next layer. A neuron Ni in a given layer may be connected to one or more neurons Nj in the next layer, and different weights wij can be associated with each neuron-neuron connection Ni-Nj for weighting signals transmitted from Ni to Nj. A neuron Nj generates output signals dependent on its accumulated inputs, and weighted signals can be propagated over successive layers of the network from an input to an output neuron layer. An artificial neural network machine learning model can undergo a training phase in which the sets of weights associated with respective neuron layers are determined. The network is exposed to a set of training data, in an iterative training scheme in which the weights are repeatedly updated as the network "learns" from the training data. The resulting trained model, with weights defined via the training operation, can be applied to perform a task based on new data.

An example of the neural network model is a recurrent neural network model, which can handle time series data or sequence based-data such as sentences in a language. A recurrent neural network model can have a series of neural network cells 302a, 302b, 302n, which take as input a word in a sentence and also activation information from the previous neural network in the previous time step. For example, copies of neural network are made over time with different inputs at different time steps. The copies of neural network can share weights over time. The neural network at 302b can take both the input word (e.g., $x_2$) at that time step (e.g., t=2) and activation information from the previous neural network at the previous time step (e.g., t=1), to predict the next word, e.g., its output $\hat{y}_2$. For example, the activation value $a_1$ from time step 1 is passed onto time step 2. The neural network 302b at time step 2 uses both the activation value and input word to predict the next word. Similarly, at time step n, the neural network the next word in a given sentence is received along with the activation value $a_2$ computed at the previous time step to predict its output (next word). At each time step, the recurrent neural network passes on its activation to the next time step for use. Thus, at the current step, both the input word for that step and information from previous words in the sentence can be used to predict the next word. In the figure, $a_0$ can be an initial activation vector, which can be initialized to zeros or other initial values. A language model can predict a next word, for example, given a word in a sentence, for example, in sequence. For instance, such a language model may output a percentage value or score that the next word is word xyz.

The architecture shown in FIG. 3 is only an example of a neural network, an example of a recurrent neural network model, which can be used to generate the language models described herein. Other and different model architecture can be used. For example, different types of recurrent neural network models such as but not limited to Long Short-Term Memory (LSTM), different types of neural network models, different types of deep learning neural network models can be used. Yet in other aspects, different types of artificial intelligence models can be used.

Figure 4:
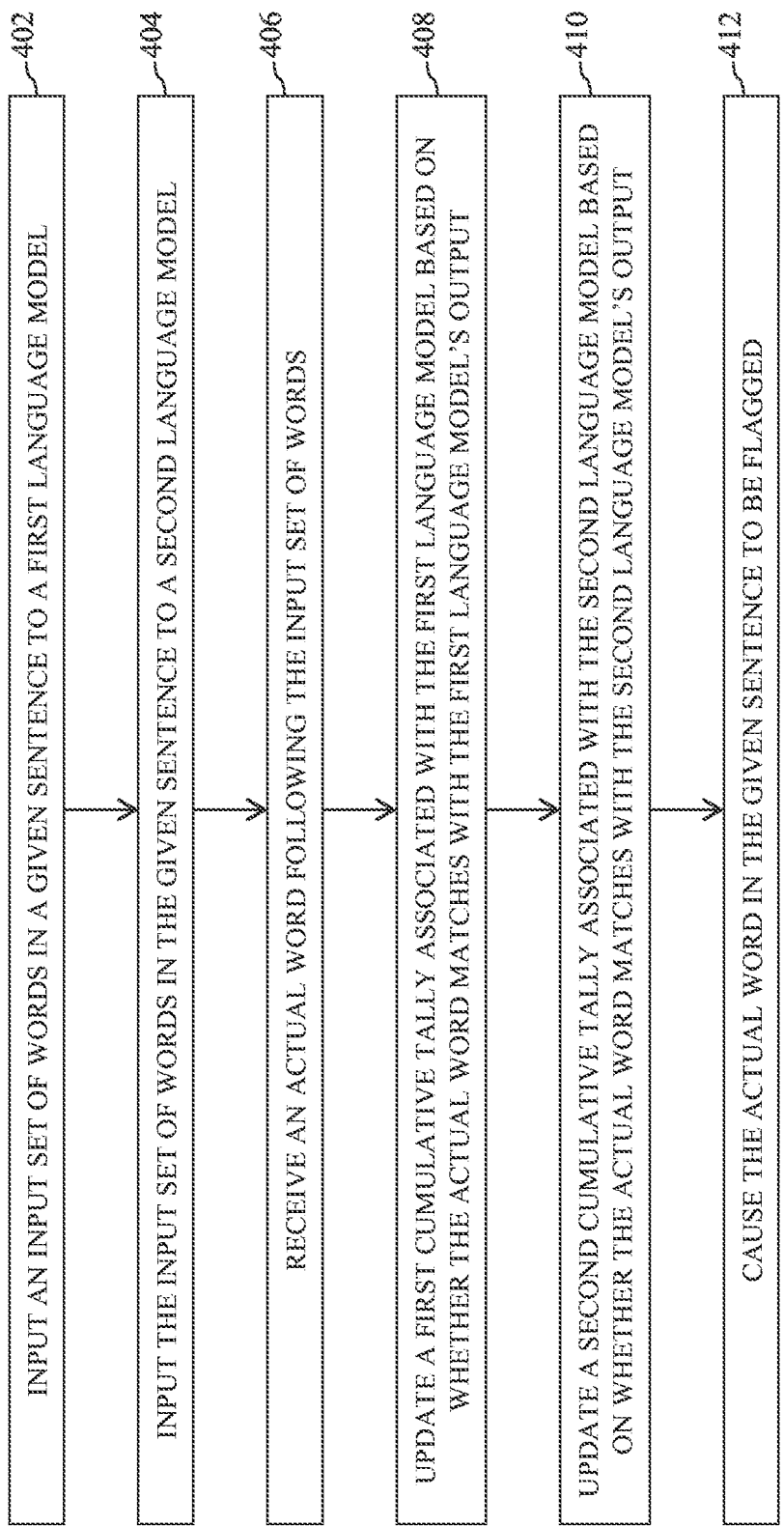
FIG. 4 is a flow diagram illustrating a method in one embodiment, which can provide automated corrective feedback.

FIG. 4 is a flow diagram illustrating a method in one embodiment, which can provide automated corrective feed. At 402, the method may include inputting an input set of words in a given sentence to a first language model. The first language model outputs a first set of candidate words predicted to follow the input set of words in the given sentence. The first language model further outputs a score associated with each of the candidate words in the first set of candidate words.

At 404, the method may also include inputting the input set of words in the given sentence to a second language model. The second language model output a second set of candidate words predicted to follow the input set of words in the given sentence. The second language model further outputs a score associated with each of the candidate words in the second set of candidate words. In some embodiments, the given sentence can be fed into the first language model and the second language model one word at a time.

At 406, the method may include receiving an actual word following the input set of words. For instance, a user may have entered the next word via a user interface following the input set of words, and that next word is received as the actual word. The actual word may be compared with the output of the first language model, and the output of the second language model.

At 408, responsive to determining that the actual word matches with a candidate word in the first set of candidate words, the method may include updating a first cumulative tally associated with the first language model with the score associated with the candidate word in the first set matching the actual word.

At 410, responsive to determining that the actual word matches with a candidate word in the second set of candidate words, the method may include updating a second cumulative tally associated with the second language model with the score associated with the candidate word in the second set matching the actual word.

The first cumulative tally and the second cumulative tally may be compared. At 412, responsive to determining that the first cumulative tally and the second cumulative tally deviate by more than a pre-defined threshold, the actual word in the given sentence can be flagged. For example, a user interface can be caused to display or highlight the actual word in the given sentence. In some embodiments, the method may further include causing a presentation of the first set of candidate words responsive to the flagged actual word being selected.

In some embodiments, a method may also include training the first language model based on a first training data set. The first language model is trained to predict a first set of next words to follow an input set of words in a given sentence. The first language model can be trained to output the first set of next words and a score associated with each of the next words in the first set.

In some embodiments, a method may also include training the second language model based on a second training data set. The second language model is trained to predict a second set of next words to follow an input set of words in the given sentence. The second language model can be trained to output the second set of next words and a score associated with each of the next words in the second set.

The first language model and the second language model can be artificial neural network models, for example, recurrent neural network models, but not limited to only those types of models. Other types of models can be trained. The first language model can be trained based on a first training data set including at least data determined to have proper usage of a language, and the second language model can be trained based on a second training data set including at least data determined to have incorrect usage of the language.

In some embodiments, the first training data set can include at least data associated with a category of submission. The first language model can be trained to output the first set of next words likely to be associated with language found in the category of submission.

In some embodiments, the first training data set can include at least data associated with a category of submission grouped by a cohort. The first language model can be trained to output the first set of next words likely to be associated with language found in the category of submission grouped by the cohort.

Figure 5:
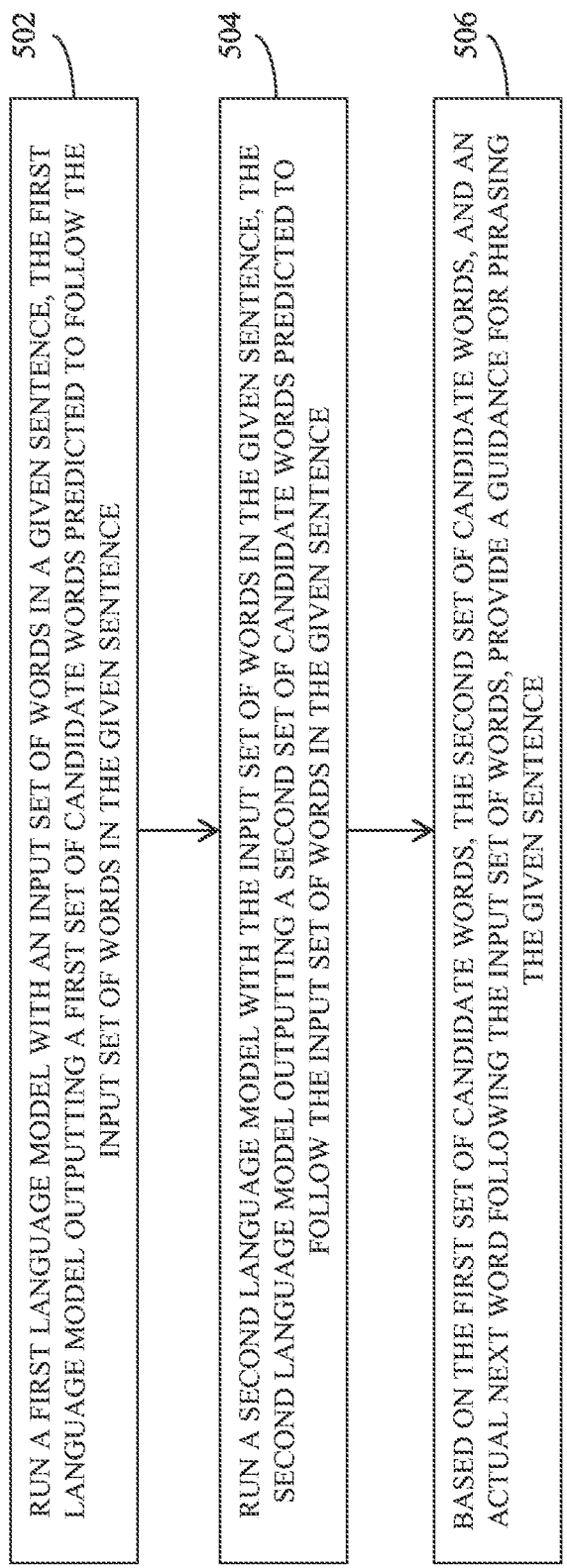
FIG. 5 is a flow diagram illustrating a method in another embodiment.

FIG. 5 is a flow diagram illustrating a method in another embodiment. At 502, the method may include running a first language model with an input set of words in a given sentence. The first language model outputs a first set of candidate words predicted to follow the input set of words in the given sentence. At 504, the method may include running a first language model with the input set of words in the given sentence. The second language model outputs a second set of candidate words predicted to follow the input set of words in the given sentence. At 506, based on the first set of candidate words, the second set of candidate words, and an actual next word following the input set of words, the method may include providing guidance for phrasing the given sentence.

Figure 6:
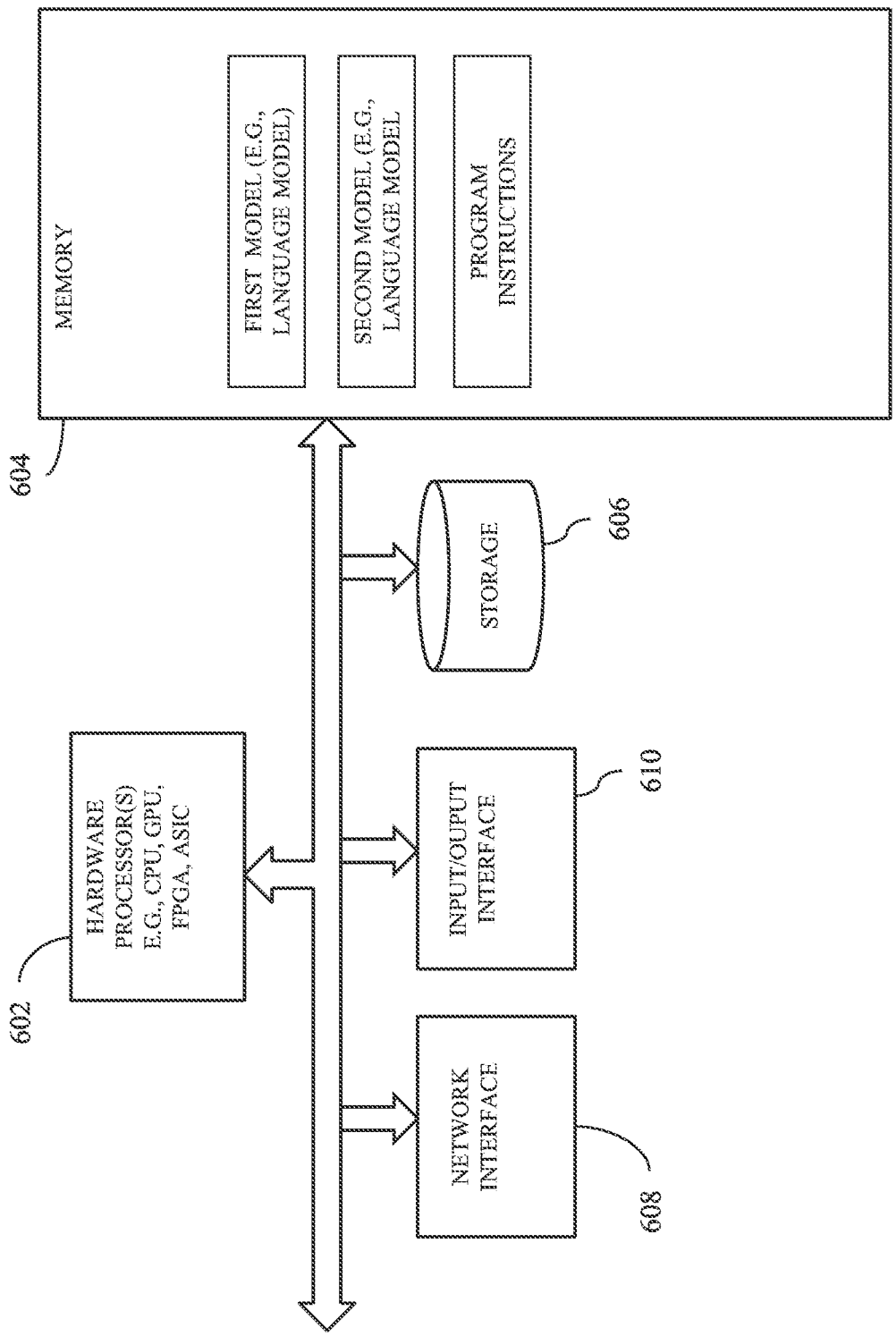
FIG. 6 is a diagram showing components of a system in one embodiment that can automate feedback provision in language usage.

FIG. 6 is a diagram showing components of a system in one embodiment that can automate feedback provision in language usage. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and provide automate feedback in language usage, for example, during a language exercise. A memory device 604 may include random access memory (RAM), read-only memory (ROM) or another memory device, and may store data and/or processor instructions for implementing various functionalities associated with the methods and/or systems described herein.

One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. The memory device 604 may also store a first language model and a second language model.

One or more hardware processors 602 may run the first language model with an input set of words in a given sentence. The first language model may output a first set of candidate words predicted to follow the input set of words in the given sentence. The first language model may further output a score associated with each of the candidate words in the first set of candidate words. One or more hardware processors 602 may also run the second language model with the input set of words in the given sentence. The second language model may output a second set of candidate words predicted to follow the input set of words in the given sentence. The second language model may further output a score associated with each of the candidate words in the second set of candidate words. A given sentence can be fed into the first language model and the second language model one word at a time.

One or more hardware processors 602 also may receive an actual word following the input set of words. For example, a user may have written or entered the next word following the input set of words. One or more hardware processors 602, responsive to determining that the actual word matches with a candidate word in the first set of candidate words, may update a first cumulative tally associated with the first language model with the score associated with the candidate word in the first set matching the actual word. One or more hardware processors 602, responsive to determining that the actual word matches with a candidate word in the second set of candidate words, may update a second cumulative tally associated with the second language model with the score associated with the candidate word in the second set matching the actual word. One or more hardware processors 602, responsive to determining that the first cumulative tally and the second cumulative tally deviate by more than a predefined threshold, identify the actual word in the given sentence for flagging.

In some embodiments, one or more hardware processors 602 may also train the first language model and the second language model. The first language model may be trained based on a first training data set. The first language model is trained to predict a first set of next words to follow an input set of words in a given sentence. The first language model can be trained to output the first set of next words and a score associated with each of the next words in the first set. The second language model may be trained based on a second training data set. The second language model is trained to predict a second set of next words to follow an input set of words in the given sentence. The second language model can be trained to output the second set of next words and a score associated with each of the next words in the second set.

In some embodiments, the first language model and the second language model are artificial neural network models. For example, the first language model and the second language model can be recurrent neural network models.

The first language model can be trained based on a first training data set including at least data determined to have proper usage of a language, and the second language model can be trained based on a second training data set including at least data determined to have incorrect usage of the language.

In some embodiments, the first training data set can include at least data associated with a category of submission, and the first language model can be trained to output the first set of next words likely to be associated with language found in the category of submission.

In some embodiments, the first training data set can include at least data associated with a category of submission grouped by a cohort, and the first language model can be trained to output the first set of next words likely to be associated with language found in the category of submission grouped by the cohort.

In some embodiments, the first and/or second training data sets may be stored in a storage device 606 or received or obtained via a network interface 608 from a remote device, and may be temporarily loaded into a memory device 604 for building or generating the models. The learned models may be stored on a memory device 604, for example, for execution by one or more hardware processors 602. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

In some embodiments, one or more hardware processors 602 can cause flagging of the actual word in the given sentence. One or more hardware processors 602 can also cause highlighting of the actual word in the given sentence. One or more hardware processors 602 can provide the first set of candidate words, and for example, cause a presentation of the first set of candidate words, for example, via a user interface, for example, to be displayed in the vicinity of the highlighted portion of the given sentence.

Unless otherwise explicitly noted, one or more elements, features and/or components of various embodiments described herein can be mixed and/or combined.

Figure 7:
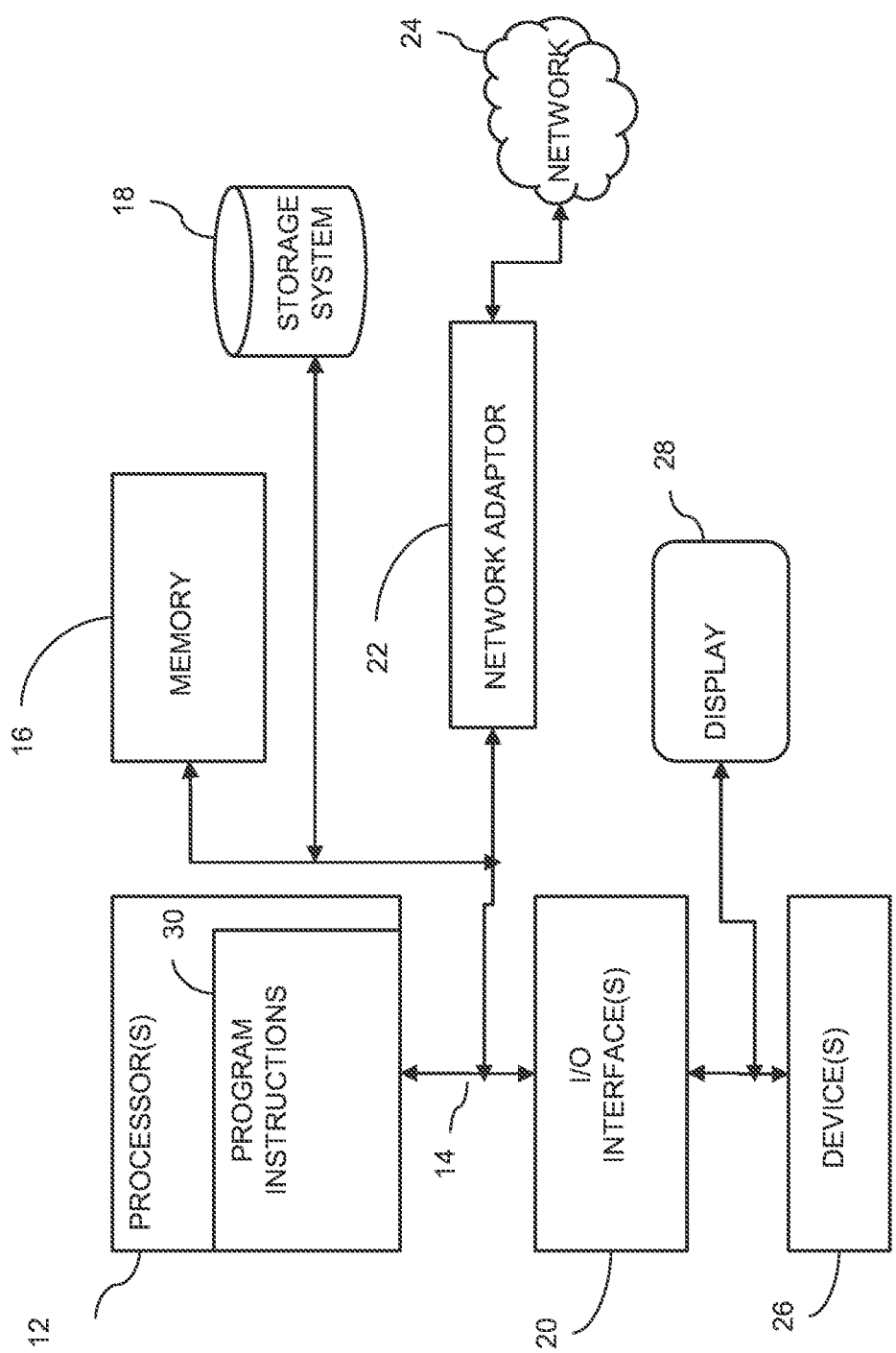
FIG. 7 illustrates a schematic of an example computer or processing system that may implement an automated language usage feedback system in one embodiment.

FIG. 7 illustrates a schematic of an example computer or processing system that may implement an automated language usage feedback system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
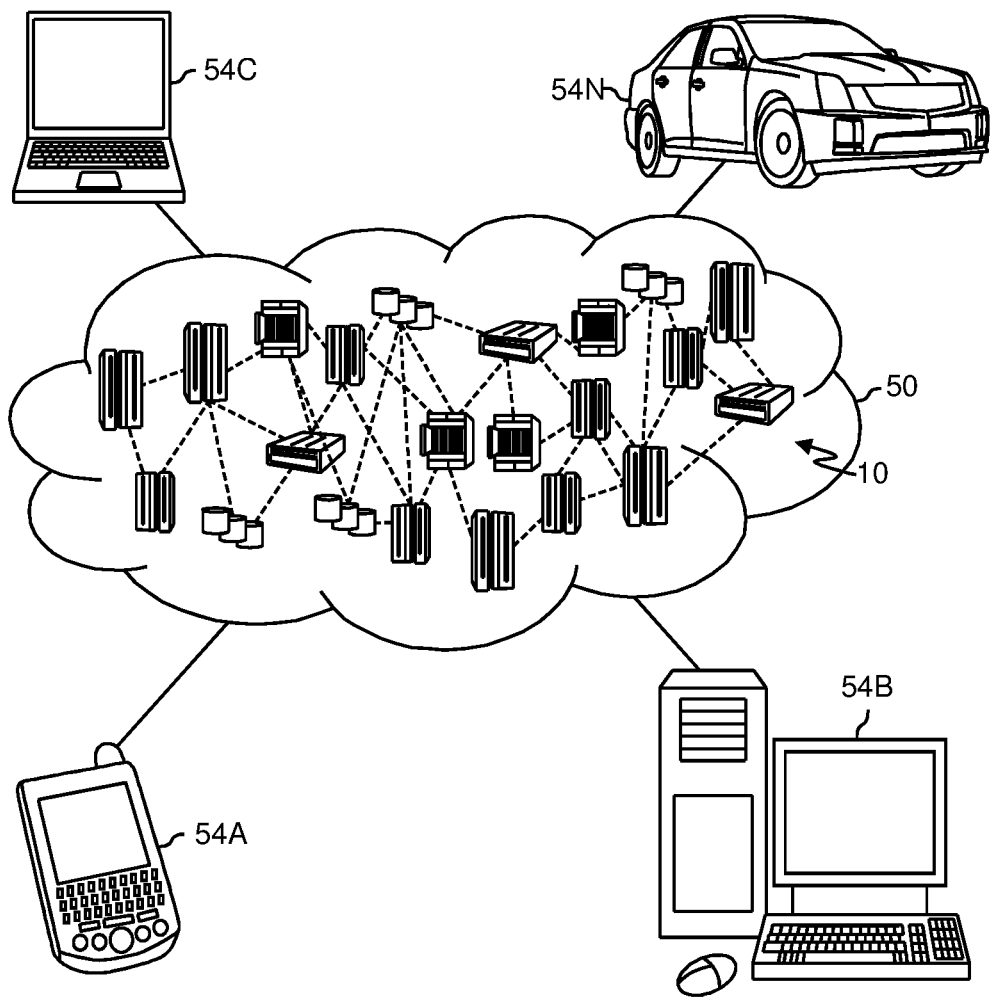
FIG. 8 illustrates a cloud computing environment in one embodiment.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
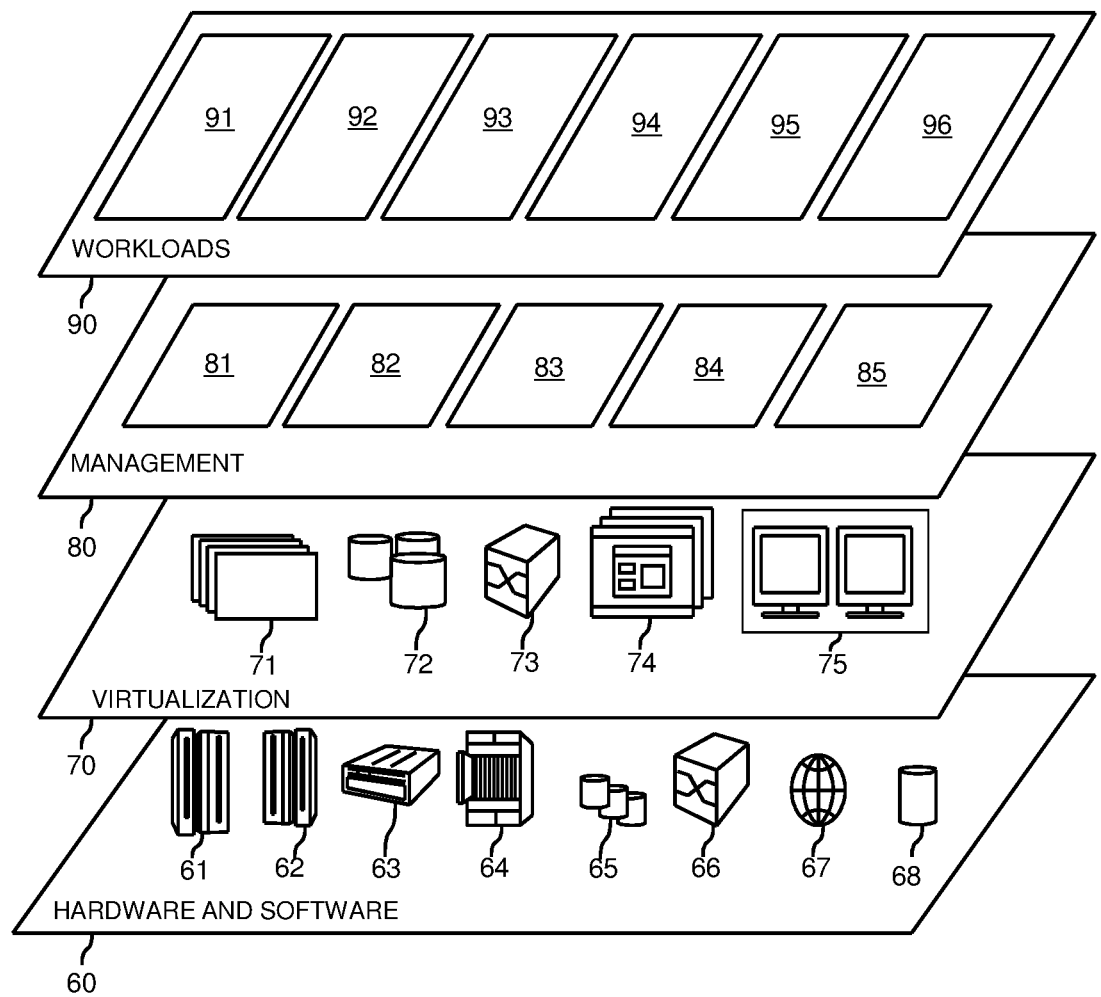
FIG. 9 illustrates a set of functional abstraction layers provided by cloud computing environment in one embodiment of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated feedback processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Embodiments and/or components of embodiments disclosed herein can be freely combined with each other if they are not mutually exclusive.

What is claimed is:

1. A system comprising:
   at least one hardware processor;
   a memory device coupled to the at least one hardware processor;
   a first language model stored on the memory device; and
   a second language model stored on the memory device;
   the at least one hardware processor operable to at least:
   run the first language model with an input set of words in a given sentence, the first language model outputting a first set of candidate words predicted to follow the input set of words in the given sentence, the first language model further outputting a score associated with each of the candidate words in the first set of candidate words;
   run the second language model with the input set of words in the given sentence, the second language model outputting a second set of candidate words predicted to follow the input set of words in the given sentence, the second language model further outputting a score associated with each of the candidate words in the second set of candidate words;
   receive an actual word following the input set of words;
   responsive to determining that the actual word matches with a candidate word in the first set of candidate words, update a first cumulative tally associated with the first language model with the score associated with the candidate word in the first set matching the actual word;
   responsive to determining that the actual word matches with a candidate word in the second set of candidate words, update a second cumulative tally associated with the second language model with the score associated with the candidate word in the second set matching the actual word;
   compare the first cumulative tally with the second cumulative tally;
   responsive to determining that the first cumulative tally and the second cumulative tally deviate from one another by more than a pre-defined threshold, identify the actual word in the given sentence for flagging; and
   keep track of a position in the given sentence where the first cumulative tally deviated from the second cumulative tally,
   wherein the first language model is trained based on a first training data set including at least data determined to have proper usage of a language, and the second language model is trained based on a second training data set including at least data determined to have incorrect usage of the language.

2. The system of claim 1, wherein the first language model and the second language model are artificial neural network models.

3. The system of claim 2, wherein the first language model and the second language model are recurrent neural network models.

4. The system of claim 1, wherein the first training data set includes at least data associated with a category of submission, wherein the first language model is trained to output the first set of next words likely to be associated with language found in the category of submission.

5. The system of claim 1, wherein the first training data set includes at least data associated with a category of submission grouped by a cohort, wherein the first language model is trained to output the first set of next words likely to be associated with language found in the category of submission grouped by the cohort.

6. The system of claim 1, wherein the given sentence is fed into the first language model and the second language model one word at a time.

7. The system of claim 1, wherein the at least one hardware processor is operable to cause flagging of the actual word in the given sentence.

8. The system of claim 1, wherein the at least one hardware processor is operable to cause highlighting of the actual word in the given sentence.

9. The system of claim 1, wherein the at least one hardware processor is operable to provide the first set of candidate words.

10. The system of claim 9, wherein the at least on hardware processor is operable to cause a presentation of the first set of candidate words.

11. A method comprising:
    inputting an input set of words in a given sentence to a first language model, the first language model outputting a first set of candidate words predicted to follow the input set of words in the given sentence, the first language model further outputting a score associated with each of the candidate words in the first set of candidate words;
    inputting the input set of words in the given sentence to a second language model, the second language model outputting a second set of candidate words predicted to follow the input set of words in the given sentence, the second language model further outputting a score associated with each of the candidate words in the second set of candidate words;
    receiving an actual word following the input set of words;
    responsive to determining that the actual word matches with a candidate word in the first set of candidate words, updating a first cumulative tally associated with the first language model with the score associated with the candidate word in the first set matching the actual word;
    responsive to determining that the actual word matches with a candidate word in the second set of candidate words, updating a second cumulative tally associated with the second language model with the score associated with the candidate word in the second set matching the actual word;
    compare the first cumulative tally with the second cumulative tally;
    responsive to determining that the first cumulative tally and the second cumulative tally deviate from one another by more than a pre-defined threshold, causing the actual word in the given sentence to be flagged; and
    keep track of a position in the given sentence where the first cumulative tally deviated from the second cumulative tally,
    wherein the first language model is trained based on a first training data set including at least data determined to have proper usage of a language, and the second language model is trained based on a second training data set including at least data determined to have incorrect usage of the language.

12. The method of claim 11, wherein the first language model and the second language model are artificial neural network models.

13. The method of claim 12, wherein the first language model and the second language model are recurrent neural network models.

14. The method of claim 11, wherein the first training data set includes at least data associated with a category of submission, wherein the first language model is trained to output the first set of next words likely to be associated with language found in the category of submission.

15. The method of claim 11, wherein the first training data set includes at least data associated with a category of submission grouped by a cohort, wherein the first language model is trained to output the first set of next words likely to be associated with language found in the category of submission grouped by the cohort.

16. The method of claim 11, wherein the given sentence is fed into the first language model and the second language model one word at a time.

17. The method of claim 11, wherein the method further comprises causing a presentation of the first set of candidate words responsive to the flagged actual word being selected.

18. A computer program product comprising a computer readable storage medium having program instructions embodied therewith, the program instructions readable by a device to cause the device to:
  run by the device, a first language model with an input set of words in a given sentence, the first language model outputting a first set of candidate words predicted to follow the input set of words in the given sentence;
  run by the device, a second language model with the input set of words in the given sentence, the second language model outputting a second set of candidate words predicted to follow the input set of words in the given sentence; and
  based on the first set of candidate words, the second set of candidate words, and an actual next word following the input set of words, provide by the device, guidance for phrasing the given sentence,
  keep track of a position in the given sentence where a first cumulative tally associated the first language model deviate from a second cumulative tally associated the second language model, wherein at least one of the first cumulative tally and the second cumulative tally is updated based on the actual next word,
  wherein the first language model is trained based on a first training data set including at least data determined to have proper usage of a language, and the second language model is trained based on a second training data set including at least data determined to have incorrect usage of the language.

* * * * *